(12) United States Patent
Cho (10) Patent No.: US 8,990,494 B2
(45) Date of Patent: *Mar. 24, 2015

(54) HOME STORAGE SYSTEM AND METHOD WITH VARIOUS CONTROLLERS

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 206 days.

This patent is subject to a terminal disclaimer.

(21) Appl. No.: 12/916,873

(22) Filed: Nov. 1, 2010

(65) Prior Publication Data

US 2012/0110231 A1    May 3, 2012

(51) Int. Cl.
*G06F 12/00*    (2006.01)
*G06F 13/00*    (2006.01)
*G06F 13/14*    (2006.01)
*G06F 3/00*    (2006.01)
*G06F 3/06*    (2006.01)

(52) U.S. Cl.
CPC ............ *G06F 3/0685* (2013.01); *G06F 3/0617* (2013.01); *G06F 3/0658* (2013.01)
USPC ........... 711/114; 711/110; 711/111; 711/154; 711/170; 710/22; 710/308; 710/310; 710/313; 710/17; 710/18

(58) Field of Classification Search
USPC .................................................. 711/114, 154
See application file for complete search history.

(56) References Cited

U.S. PATENT DOCUMENTS

| | | | |
|---|---|---|---|
| 5,996,071 A * | 11/1999 | White et al. | 712/238 |
| 6,178,520 B1 * | 1/2001 | DeKoning et al. | 714/5.11 |
| 7,315,911 B2 * | 1/2008 | Davies et al. | 710/260 |
| 7,634,615 B2 | 12/2009 | Sutardja | |
| 7,698,351 B1 | 4/2010 | Hing et al. | |
| 7,702,848 B2 | 4/2010 | Sutardja et al. | |
| 2003/0093721 A1 * | 5/2003 | King et al. | 714/42 |
| 2004/0177182 A1 * | 9/2004 | Metevier et al. | 710/100 |
| 2006/0148310 A1 * | 7/2006 | Funahashi | 439/502 |
| 2006/0161707 A1 | 7/2006 | Davies et al. | |
| 2007/0186039 A1 | 8/2007 | Nam | |
| 2007/0214313 A1 * | 9/2007 | Kalos et al. | 711/114 |
| 2007/0294476 A1 * | 12/2007 | Corn et al. | 711/114 |
| 2008/0010403 A1 * | 1/2008 | Tsukada et al. | 711/114 |
| 2008/0059698 A1 | 3/2008 | Kabir et al. | |
| 2008/0168304 A1 | 7/2008 | Flynn et al. | |
| 2008/0244127 A1 * | 10/2008 | Huang | 710/105 |
| 2008/0282264 A1 * | 11/2008 | Chen et al. | 719/320 |
| 2009/0204758 A1 | 8/2009 | Luning | |
| 2010/0037017 A1 | 2/2010 | Ryu et al. | |

(Continued)

FOREIGN PATENT DOCUMENTS

| | | |
|---|---|---|
| KR | 10-0928438 B1 | 11/2009 |
| KR | 10-2010-0019221 A | 2/2010 |
| KR | 10-2010-0036528 A | 4/2010 |

*Primary Examiner* — John Lane
(74) *Attorney, Agent, or Firm* — Saliwanchik, Lloyd & Eisenschenk (57) ABSTRACT

In general, embodiments of the present invention provide a home storage system and method of production. Specifically, in a typical embodiment, the home storage system includes a main controller that is coupled to a display controller, an external memory controller, an external interface, and a PCI-Express-based hybrid RAID controller. Further, a set of semiconductor storage device (SSD) memory units and a set of hard disk drive (HDD/Flash) memory units are coupled to the hybrid RAID controller. The external interface allows the storage system to establish network connectivity, while the external memory controller allows the storage device to be coupled to different types of external memory devices.

18 Claims, 5 Drawing Sheets

(56) References Cited

U.S. PATENT DOCUMENTS

| | | |
|---|---|---|
| 2010/0073860 A1 | 3/2010 | Moriai et al. |
| 2010/0100664 A1 | 4/2010 | Shimozono |
| 2010/0199036 A1 | 8/2010 | Siewert et al. |
| 2010/0312964 A1* | 12/2010 | DeKoning et al. ............ 711/114 |
| 2011/0179198 A1 | 7/2011 | Cho |
| 2012/0297135 A1* | 11/2012 | Mathew et al. ................ 711/114 |
| 2013/0019062 A1* | 1/2013 | Bennett et al. ................ 711/114 |

* cited by examiner

HOME STORAGE SYSTEM AND METHOD WITH VARIOUS CONTROLLERS

CROSS-REFERENCE TO RELATED APPLICATION

This application is related in some aspects to commonly-owned and co-pending patent application Ser. No. 12/848,281, entitled "Hybrid RAID Controller", which was filed Aug. 2, 2010, the entire contents of which are herein incorporated by reference. This application is also related in some aspects to commonly-owned, co-pending patent application Ser. No. 12/763,688, entitled "RAID Controller for a Semiconductor Storage Device", which was filed on Apr. 20, 2010. This application is also related in some aspects to commonly-owned, co-pending, patent application Ser. No. 12/848,348, entitled "RAID Controller Having Multi PCI Bus Switching", which was filed on Aug. 2, 2010. This application is also related in some aspects to commonly-owned, co-pending patent application Ser. No. 12/885,518, entitled "Hybrid RAID Controller Having Multi PCI Bus Switching", which was filed on Sep. 19, 2010. This application is also related in some aspects to commonly-owned, co-pending patent application Ser. No. 12/916,950, entitled "Home Storage Device and Software", which was filed on Nov. 1, 2010. This application is also related in some aspects to commonly-owned, co-pending patent application Ser. No. 13/018,501, entitled "RAID-based Storage Control Board", which was filed on Feb. 1, 2011.

FIELD OF THE INVENTION

The present invention relates to home storage systems. Specifically, the present invention relates to PCI-Express-based hybrid RAID controlled home storage systems.

BACKGROUND OF THE INVENTION

As the home storage device market continues to grow, there is an increasing need towards improving speed, storage size, and functionality. To this extent, several approaches have been attempted:

U.S. Pat. No. 7,698,351 allegedly discloses a GUI architecture that is configured to enable efficient management of resources in a storage system environment.

U.S. Patent Application 20100199036 allegedly discloses a system and method for tiered management levels of a RAID storage system. Data is moved between higher performing and more expensive storage device tiers and lower performing and less expensive data device tiers based upon the level of access efficiency needed for the data and related applications.

U.S. Patent Application 20100100664 allegedly discloses a storage system configured to achieve read-access response time improvement.

U.S. Patent Application 20100073860 allegedly discloses an apparatus that includes multiple memory modules, a module controller, a control board, and an interface device.

U.S. Patent Application 20090204758 allegedly discloses systems and methods for asymmetric RAID devices that include a RAID controller and a RAID volume. The RAID volume includes tiered device sets which have different levels of access speeds.

U.S. Pat. No. 7,702,848 allegedly discloses a data storage system that employs low power disk drives to cache data to and from high power disk drives to reduce power consumption and access times. A host device may be used to communicate through a memory interface such as a flash memory interface.

U.S. Pat. No. 7,634,615 allegedly discloses a data storage system that employs low power disk drives to cache data to and from high power disk drives to reduce power consumption and access times. A host device may be used to communicate through a memory interface such as a flash memory interface and lower power disk drives (LPDD).

U.S. Patent Application 20080168304 allegedly discloses an apparatus, system, and method for data storage. A parity-mirror module is used during the write operation to create redundant storage.

U.S. Patent Application 20080059698 allegedly discloses a method for automating RAID configuration on data storage media. A data structure is installed onto a data storage medium which creates a default policy using the data storage medium and is recognizable by a controller.

Unfortunately, none of these approaches leverage hybrid RAID functionality.

SUMMARY OF THE INVENTION

In general, embodiments of the present invention provide a home storage system and method of production. Specifically, in a typical embodiment, the home storage system includes a main controller that is coupled to a display controller, an external memory controller, an external interface, and a PCI-Express-based hybrid RAID controller. Further, a set of semiconductor storage device (SSD) memory units and a set of hard disk drive (HDD/Flash) memory units are coupled to the hybrid RAID controller. The external interface allows the storage system to establish network connectivity, while the external memory controller allows the storage device to be coupled to different types of external memory devices.

A first aspect of the present invention provides a home storage system, comprising: a main controller coupled to a display controller, an external memory controller, an external interface, and a hybrid RAID controller; a set of semiconductor storage device (SSD) memory units coupled to the hybrid RAID controller; and a set of hard disk drive (HDD) memory units coupled to the hybrid RAID controller.

A second aspect of the present invention provides a home storage system, comprising: a main controller; a display controller coupled to the main controller for controlling a display; an external memory controller coupled to the main controller for interfacing with an external memory device; an external interface coupled to the main controller for interfacing with a network; a PCI-Express-based hybrid RAID controller coupled to the main controller; a set of semiconductor storage device (SSD) memory units coupled to the hybrid RAID controller; and a set of hard disk drive (HDD) memory units coupled to the hybrid RAID controller.

A third aspect of the present invention provides a method for producing a home storage system, comprising: coupling a main controller to a display controller, an external memory controller, an external interface, and a hybrid RAID controller; coupling a set of semiconductor storage device (SSD) memory units to the hybrid RAID controller; and coupling a set of hard disk drive (HDD) memory units to the hybrid RAID controller.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a PCI-Express (PCI-e) type according to an embodiment will be described in detail with reference to the accompanying drawings.

As indicated above, embodiments of the present invention provide a home storage system and method of production. Specifically, in a typical embodiment, the home storage system includes a main controller that is coupled to a display controller, an external memory controller, an external interface, and a PCI-Express-based hybrid RAID controller. Further, a set of semiconductor storage device (SSD) memory units and a set of hard disk drive (HDD/Flash) memory units are coupled to the hybrid RAID controller. The external interface allows the storage system to establish network connectivity, while the external memory controller allows the storage device to be coupled to different types of external memory devices.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Figure 1:
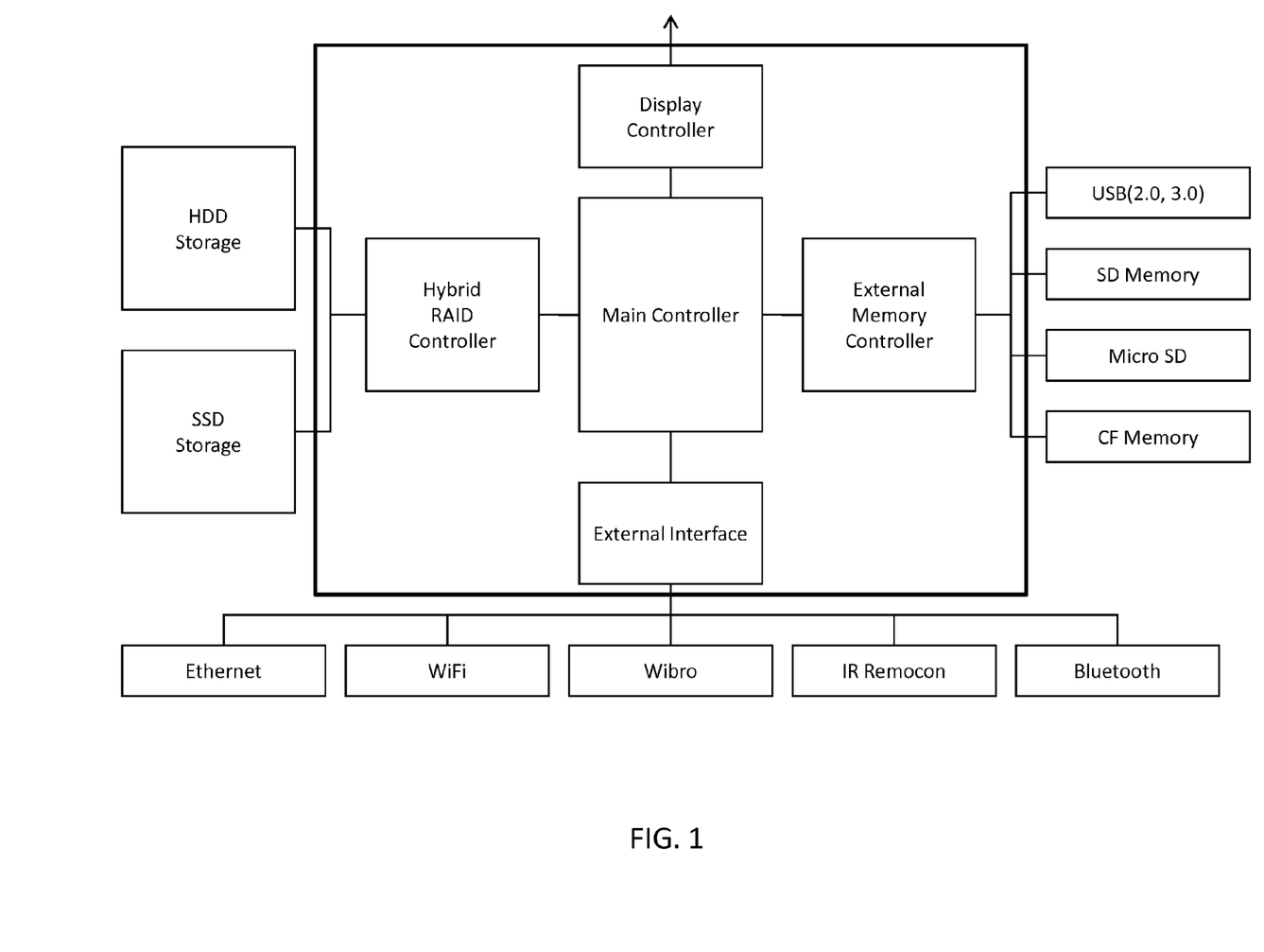
FIG. 1 is a diagram schematically illustrating a configuration of a hybrid RAID controlled home storage system.

Referring now to FIG. 1, a diagram schematically illustrating a configuration of a PCI-Express type, hybrid RAID controlled home storage device/system 90 is shown. FIG. 1 shows a hybrid RAID controlled PCI-Express type storage device according to an embodiment of the invention which includes a set (at least one) of high speed semiconductor storage device (SSD memory units 100) and a set of high density disks (HDD memory units 110). Specifically, as shown, a main controller 300 is coupled to a hybrid RAID controller 800, which itself is coupled to SDD memory units 100 and HDD memory units 110. Main controller 300 is also coupled to: an external interface 200 that provides connectivity to external devices and/or one or more networks 700; an external memory controller 400 for coupling to a set of external memory devices 600; and a display controller 500 for coupling to a display 900;

The SSD memory unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The SSD memory unit 100 may have a configuration in which the memory disks are arrayed in parallel. Moreover, SSD memory unit 100 is typically a separate disk, and is utilized by host application. Along these lines SSD memory unit 100 can be implemented as a buffer, a cache, disk space, and/or memory space for a server.

HDD memory unit 110 can: comprise an array (e.g. 8 SATA drives); can be "hot swappable"; can provide unit-based access+RAID (with conversion); and can provide progress recovery capability and progressive integration of new HDD memory units 110. The functionality of hybrid RAID controller 800 can provide progressive hot swapping. Scenario: A user couples a HDD memory unit 110 to hybrid RAID controller 800. The HDD memory unit 110 will join the RAID progressively. That is, it is integrated into the RAID system linearly to maintain system availability. In addition, RAID progressive recovery can also be provided hereunder. Scenario: A user decouples a HDD memory unit 110 from hybrid RAID controller 100. In this case, a server will progressively reconstruct the RAID. As such, system accessibility is maintained while the RAID recovers linearly. Still yet, the embodiments described herein accommodate unit-based access vs. RAID conversion. Scenario: Two HDD memory units 110 are accessed as individual units (separate drives), and six HDD memory units 110 are RAID'd. Assume that a user wishes to add one HDD memory unit 110 to the RAID, or the user wishes to remove one HDD memory unit 110 from the RAID to make it a separate unit. Conversion is rapid, transparent, and progressively linear. In addition, the embodiments discussed herein provide differential RAID. That is, HDD memory units 110 and SSD memory units 100 are RAID'd (i.e., controlled by hybrid RAID controller 800) differentially in one RAID system. Frequently accessed files or anticipated file blocks can be cached/moved to SSD memory units 100.

Figure 2:
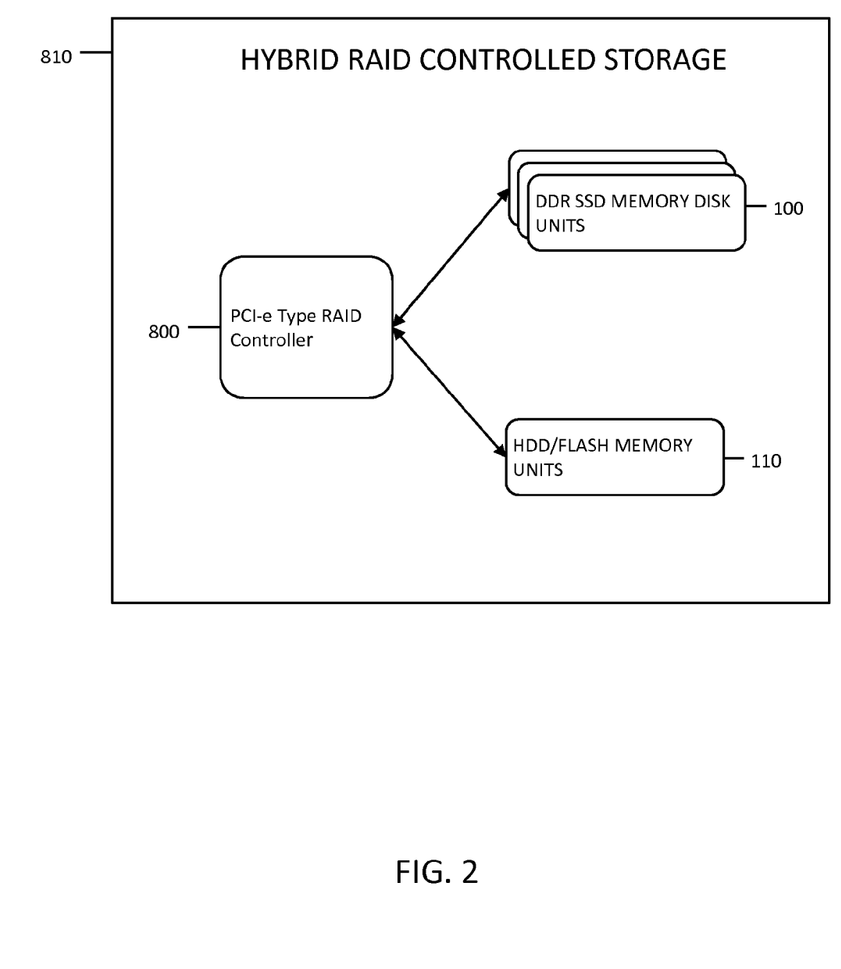
FIG. 2 is a more specific diagram of a hybrid RAID controller coupled to a set of SSD memory units and HDD memory units.

Referring now to FIG. 2, a more detailed diagram of a hybrid RAID controlled storage 810 is shown. As depicted, a PCI-e type RAID controller 800 can be directly coupled to any quantity of SSD memory units 100 and HDD/flash memory units 110. Among other things, this allows for optimum control of SSD memory units 100 and HDD memory units 110.

Figure 3:
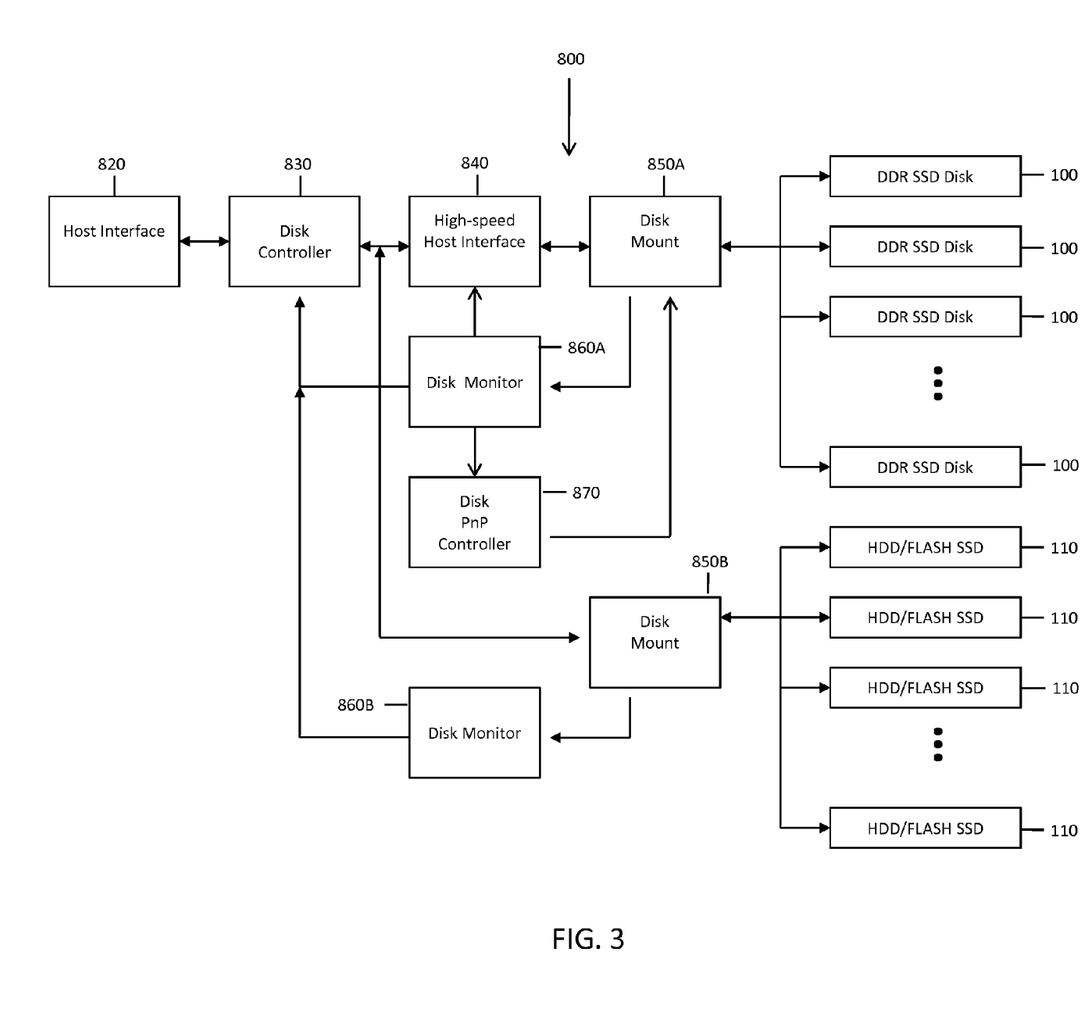
FIG. 3 is a diagram schematically illustrating the hybrid RAID controller of FIGS. 1 and 2.

Referring now to FIG. 3, a diagram of the hybrid RAID controller 800 of FIGS. 1 and 2 as coupled to a set (at least one) of SSD memory units 100 and a set of HDD/flash memory units 110 is shown in greater detail. As depicted, hybrid RAID controller 800 generally comprises: a host interface 820; a disk controller 830 coupled to host interface 820; and a high-speed host interface 840. Also coupled to disk controller 830 is a first disk monitoring unit 860A, which is coupled to the first disk mount 850A. In general, SSD memory units 100 are mounted on first disk mount 850A and are detected by first disk monitoring unit 860A. Still yet, shown coupled to disk controller 830 is a second disk monitoring unit 860B, which is coupled to a second disk mount 850B. In general, HDD/Flash memory units 110 are mounted on second disk mount 850B and are detected by second disk monitoring unit 860B. Disk plug and play (PnP controller 870) controls the functions and/or detection functions related to first disk mount 850A and second disk mount 850B. In general, hybrid RAID controller 800 controls the operation of SSD memory units 100 and HDD/Flash memory units 110. This includes the detection of SSD memory units 100 and HDD/Flash memory units 110, the storage and retrieval of data therefrom, etc.

Figure 4:
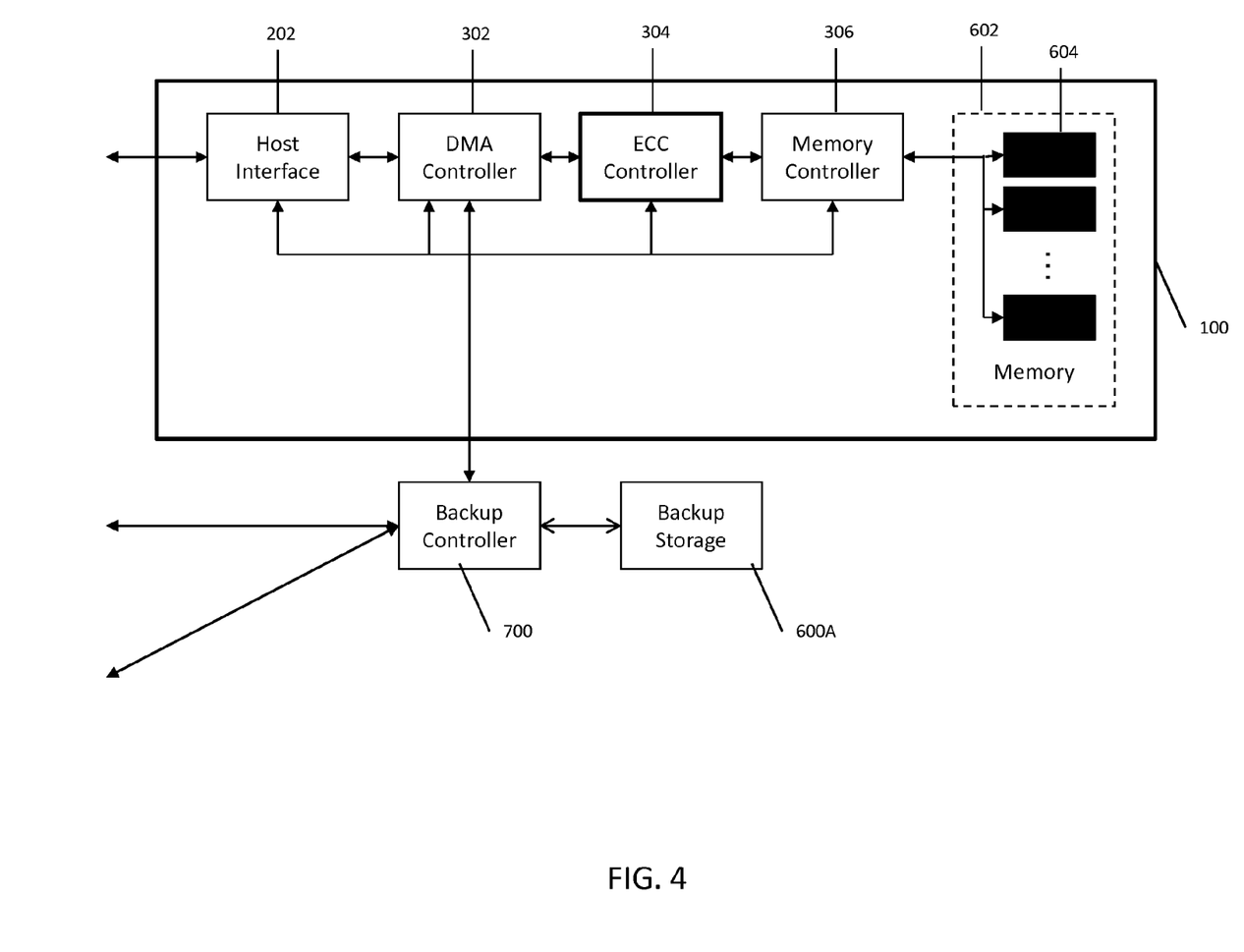
FIG. 4 is a diagram schematically illustrating a configuration of the high speed SSDs of FIG. 1.

Referring now to FIG. 4, a diagram schematically illustrating a configuration of the high speed SSD 100 is shown. As depicted, SSD memory unit 100 comprises: a host interface 202 (e.g., PCI-Express host) (which can be interface 200 of FIG. 1, or a separate interface as shown); a DMA controller 302; an ECC controller 304; and a memory controller 306 for controlling one or more blocks 604 of memory 602 that are used as high speed storage.

Figure 5:
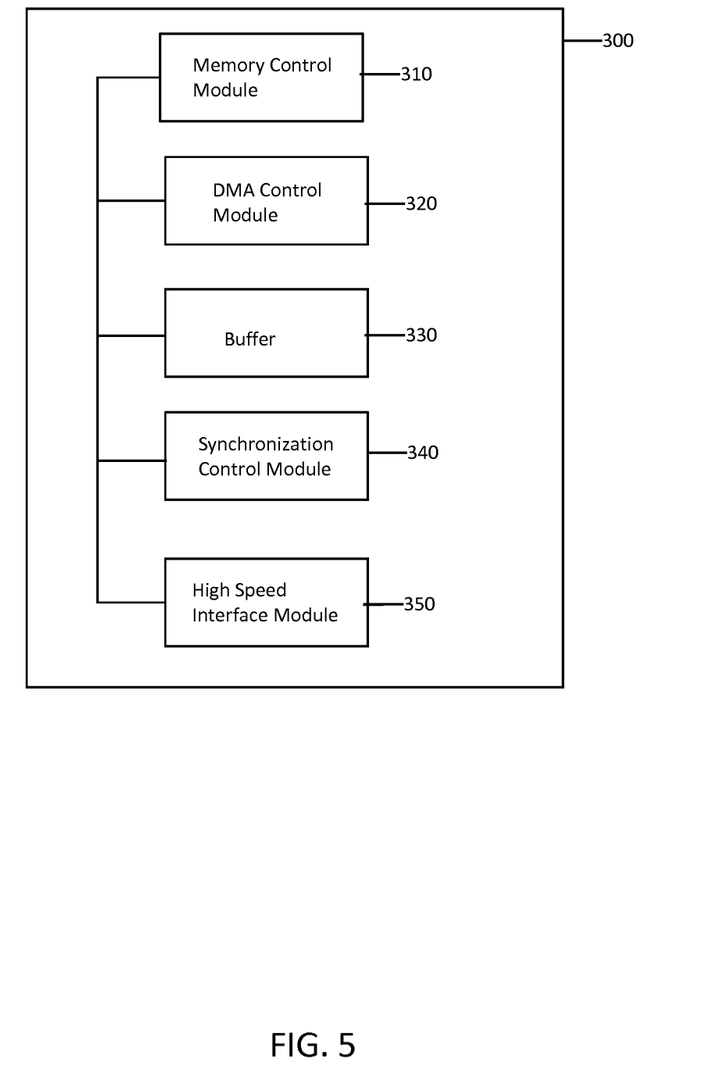
FIG. 5 is a diagram schematically illustrating the main controller of FIG. 1.

FIG. 5 is a diagram schematically illustrating one possible configuration of main controller 300 provided in the PCI-Express type home storage system/device according to the embodiments discussed herein. Referring to FIG. 5, the main controller 300 according to the embodiment includes: a memory control module 310 which controls data input/output of the memory unit 100; a DMA (Direct Memory Access) control module 320 which controls the memory control module 310 to store the data in the memory unit 100, or reads data from the memory units 100 and/or 110 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory unit 100 by the control of the DMA control module 320 through the DMA control module 320 and the memory control module 310, adjusts synchronization of a data signal so as to have a communication speed corresponding to a PCI-Express communications protocol to transmit the synchronized data signal to a PCI-Express host interface unit (not shown), and when receiving a data signal from the host through the PCI-Express host interface unit, adjusts synchronization of the data signal so as to have a transmission speed corresponding to a communications protocol (for example, PCI, PCI-x, or PCI-e, and the like) used by the memory units 100 and/or 110 to transmit the synchronized data signal to the memory units 100 and/or 110 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure and processes the data transmitted/received between the synchronization control module 340 and the DMA control module 320 without loss at high speed by buffering the data transmitted/received between the synchronization control module 340 and the DMA control module 320 using the buffers and adjusting data clocks.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The RAID controlled storage device of a PCI-Express (PCI-e) type supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:
1. A home storage system, comprising:
a main controller coupled to a display controller, an external memory controller, an external interface, and a hybrid RAID controller;

a set of semiconductor storage device (SSD) memory units coupled to the hybrid RAID controller; and
a set of hard disk drive (HDD) memory units coupled to the hybrid RAID controller, wherein the hybrid RAID controller is configured such that each HDD memory unit of the set is progressively hot swapped to be integrated into the hybrid RAID controller;
wherein the main controller comprises:
a memory control module for controlling data input and output of the set of SSD memory units and the set of HDD memory units;
a DMA control module which controls the memory control module to store data in the set of SSD memory units and the set of HDD memory units or read data from the set of SSD memory units and the set of HDD memory units to provide the data to a host, according to an instruction from the host received through a host interface unit;
a buffer which buffers data according to control of the DMA control module;
a synchronization control module which, when receiving a data signal corresponding to the data read from the set of SSD memory units and the set of HDD memory units by the control of the DMA control module through the DMA control module and the memory control module, adjusts synchronization of a data signal so as to have a communication speed corresponding to a PCI-Express communications protocol to transmit the synchronized data to the PCI-Express host interface unit, and, when receiving a data signal from the host through the PCI-Express host interface unit, adjusts synchronization of the data signal so as to have a transmission speed corresponding to a communications protocol used by the set of SSD memory units and the set of HDD memory units to transmit the synchronized data signal to the set of PCI-Express memory units through the DMA control module and the memory control module; and
a high-speed interface module which processes the data transmitted/received between the synchronization control module and the DMA control module at high speed, includes a buffer having a double buffer structure and a buffer having a circular queue structure, and processes the data transmitted/received between the synchronization control module and the DMA control without loss of high speed by buffering the data transmitted/received between the synchronization control module and the DMA control module using the buffers and adjusting data clocks.

2. The home storage system of claim 1, the hybrid RAID controller comprising:
a first disk mount coupled to the set of SSD memory units, the set of SSD memory units comprising a set of volatile semiconductor memories;
a first disk monitoring unit coupled to the first disk mount for monitoring the set of SSD memory units;
a disk plug and play controller coupled to the first disk monitoring unit and the first disk mount for controlling the disk mount;
a high speed host interface coupled to the first disk monitoring unit and the first disk mount for providing high-speed host interface capabilities;
a second disk mount coupled to the set of HDD memory units; and
a second disk monitoring unit coupled to the second disk mount for monitoring the set of HDD memory units.

3. The home storage system of claim 2, the hybrid RAID controller further comprising a disk controller coupled to the high speed host interface, the first disk monitoring unit and the second disk monitoring unit.

4. The home storage system of claim 3, the hybrid RAID controller further comprising the host interface coupled to the disk controller.

5. The home storage system of claim 1, the external interface being coupled to at least one type of network.

6. The home storage system of claim 1, the external memory controller being coupled to at least one type of external memory.

7. The home storage system of claim 1, the display controller being coupled to a display.

8. The home storage system of claim 1, the hybrid RAID controller being PCI-Express-based.

9. A home storage system, comprising:
a main controller;
a display controller coupled to the main controller for controlling a display;
an external memory controller coupled to the main controller for interfacing with an external memory device;
an external interface coupled to the main controller for interfacing with a network;
a PCI-Express-based hybrid RAID controller coupled to the main controller;
a set of semiconductor storage device (SSD) memory units coupled to the hybrid RAID controller; and
a set of hard disk drive (HDD) memory units coupled to the hybrid RAID controller, wherein the hybrid RAID controller is configured such that each HDD memory unit of the set is progressively hot swapped to be integrated into the hybrid RAID controller;
wherein the main controller comprises:
a memory control module for controlling data input and output of the set of SSD memory units and the set of HDD memory units;
a DMA control module which controls the memory control module to store data in the set of SSD memory units and the set of HDD memory units or read data from the set of SSD memory units and the set of HDD memory units to provide the data to a host, according to an instruction from the host received through a host interface unit;
a buffer which buffers data according to control of the DMA control module;
a synchronization control module which, when receiving a data signal corresponding to the data read from the set of SSD memory units and the set of HDD memory units by the control of the DMA control module through the DMA control module and the memory control module, adjusts synchronization of a data signal so as to have a communication speed corresponding to a PCI-Express communications protocol to transmit the synchronized data signal to the PCI-Express host interface unit and, when receiving a data signal from the host through the PCI-Express host interface unit, adjusts synchronization of the data signal so as to have a transmission speed corresponding to a communications protocol used by the set of SSD memory units and the set of HDD memory units to transmit the synchronized data signal to the set of PCI-Express memory units through the DMA control module and the memory control module; and
a high-speed interface module which processes the data transmitted/received between the synchronization control module and the DMA control module at high speed, includes a buffer having a double buffer structure and a buffer having a circular queue structure, and processes the data transmitted/received between the synchronization control module and the DMA control without loss of high speed by buffering the data transmitted/received between the synchronization control module and the DMA control module using the buffers and adjusting data clocks.

10. The home storage system of claim 9, the PCI-Express-based hybrid RAID controller comprising:
a first disk mount coupled to the set of SSD memory units, the set of SSD memory units comprising a set of volatile semiconductor memories;
a first disk monitoring unit coupled to the first disk mount for monitoring the set of SSD memory units;
a disk plug and play controller coupled to the first disk monitoring unit and the first disk mount for controlling the disk mount;
a high speed host interface coupled to the first disk monitoring unit and the first disk mount for providing high-speed host interface capabilities;
a second disk mount coupled to the set of HDD memory units; and a second disk monitoring unit coupled to the second disk mount for monitoring the set of HDD memory units.

11. The home storage system of claim 10, the PCI-Express-based hybrid RAID controller further comprising a disk controller coupled to the high speed host interface, the first disk monitoring unit and the second disk monitoring unit.

12. The home storage system of claim 11, the PCI-Express-based hybrid RAID controller further comprising the host interface coupled to the disk controller.

13. A method for producing a home storage system, comprising:
coupling a main controller to a display controller, an external memory controller, an external interface, and a hybrid RAID controller;
coupling a set of semiconductor storage device (SSD) memory units to the hybrid RAID controller; and
coupling a set of hard disk drive (HDD) memory units to the hybrid RAID controller, wherein the hybrid RAID controller is configured such that each HDD memory unit of the set is progressively hot swapped to be integrated into the hybrid RAID controller;
wherein the main controller comprises:
a memory control module for controlling data input and output of the set of SSD memory units and the set of HDD memory units;
a DMA control module which controls the memory control module to store data in the set of SSD memory units and the set of HDD memory units or read data from the set of SSD memory units and the set of HDD memory units to provide the data to a host, according to an instruction from the host received through a host interface unit;
a buffer which buffers data according to control of the DMA control module;
a synchronization control module which, when receiving a data signal corresponding to the data read from the set of SSD memory units and the set of HDD memory units by the control of the DMA control module through the DMA control module and the memory control module, adjusts synchronization of a data signal so as to have a communication speed corresponding to a PCI-Express communications protocol to transmit the synchronized data signal to the PCI-Express host interface unit and, when receiving a data signal from the host through the PCI-Express host interface unit, adjusts synchronization of the data signal so as to have a transmission speed corresponding to a communications protocol used by the set of SSD memory units and the set of HDD memory units to transmit the synchronized data signal to the set of PCI-Express memory units through the DMA control module and the memory control module; and
a high-speed interface module which processes the data transmitted/received between the synchronization control module and the DMA control module at high speed, includes a buffer having a double buffer structure and a buffer having a circular queue structure, and processes the data transmitted/received between the synchronization control module and the DMA control without loss of high speed by buffering the data transmitted/received between the synchronization control module and the DMA control module using the buffers and adjusting data clocks.

14. The method of claim 13, further comprising producing the hybrid RAID controller by:
coupling a first disk mount to the set of SSD memory units, the set of SSD memory units comprising a set of volatile semiconductor memories;
coupling a first disk monitoring unit to the first disk mount for monitoring the set of SSD memory units;
coupling a disk plug and play controller to the first disk monitoring unit and the first disk mount for controlling the disk mount;
coupling a high speed host interface to the first disk monitoring unit and the first disk mount for providing high-speed host interface capabilities;
coupling a second disk mount to the set of HDD memory units; and
coupling a second disk monitoring unit to the second disk mount for monitoring the set of HDD memory units.

15. The method of claim 14, further comprising coupling a disk controller to the high speed host interface, the first disk monitoring unit and the second disk monitoring unit.

16. The method of claim 15, further comprising coupling a host interface to the disk controller.

17. The method of claim 13, further comprising connecting the external interface to at least one type of network.

18. The method of claim 13, the hybrid RAID controller being PCI-Express-based.

* * * * *